(12) United States Patent
Shin et al.

(10) Patent No.: US 8,759,478 B2
(45) Date of Patent: Jun. 24, 2014

(54) METHOD FOR PREPARING POLYARYLENE SULFIDE HAVING REDUCED IODINE CONTENT

(75) Inventors: Yong-Jun Shin, Seoul (KR); Il-Hoon Cha, Gyeonggi-do (KR); Jae-Bong Lim, Gyeonggi-do (KR); Sung-Gi Kim, Gyeonggi-do (KP)

(73) Assignee: SK Chemicals Co., Ltd. (KR)

( * ) Notice: Subject to any disclaimer, the term of this patent is extended or adjusted under 35 U.S.C. 154(b) by 0 days.

(21) Appl. No.: 13/576,229

(22) PCT Filed: Jan. 31, 2011

(86) PCT No.: PCT/KR2011/000667
§ 371 (c)(1),
(2), (4) Date: Jul. 31, 2012

(87) PCT Pub. No.: WO2011/093685
PCT Pub. Date: Aug. 4, 2011

(65) Prior Publication Data
US 2012/0302726 A1 Nov. 29, 2012

(30) Foreign Application Priority Data
Feb. 1, 2010 (KR) .................. 10-2010-0009115

(51) Int. Cl.
*C08G 75/00* (2006.01)

(52) U.S. Cl.
USPC ............ 528/381; 528/389; 528/373; 528/388

(58) Field of Classification Search
USPC .................................. 528/381, 389, 373, 388
See application file for complete search history.

(56) References Cited

U.S. PATENT DOCUMENTS

| | | | |
|---|---|---|---|
| 2,513,188 A | 6/1950 | Macallum | |
| 2,583,941 A | 1/1952 | Gordon, Jr. | |
| 4,746,758 A | 5/1988 | Rule et al. | |
| 4,786,713 A | 11/1988 | Rule | |
| 4,952,671 A | 8/1990 | Fagerburg et al. | |
| 5,177,183 A | 1/1993 | Hay et al. | |
| 6,201,098 B1 | 3/2001 | Haubs et al. | |
| 8,242,233 B2 | 8/2012 | Lee et al. | |
| 2009/0203872 A1* | 8/2009 | Lee et al. ............... | 528/373 |

FOREIGN PATENT DOCUMENTS

| | | | |
|---|---|---|---|
| CN | 1032663 A | 5/1989 | |
| CN | 101595165 A | 12/2009 | |
| EP | 0358355 | * 8/1989 | ............ C08G 75/02 |
| EP | 0403407 A1 | 12/1990 | |

OTHER PUBLICATIONS

"Chinese Application Serial No. 201180010681.4, Office Action mailed Jul. 18, 2013", 6 pgs.
"International Application Seriai No. PCT/KR2011/000667, International Search Report mailed Oct. 28, 2011", (w/ English Translation), 5 pgs.

* cited by examiner

*Primary Examiner* — Shane Fang
(74) *Attorney, Agent, or Firm* — Schwegman, Lundberg & Woessner, P.A.

(57) ABSTRACT

A method for preparing polyarylene sulfide having reduced iodine content and excellent thermal stability is described. The method includes reacting a composition comprising diiodide aromatic compounds, sulfur compounds, and a polymerization terminator. The preparation method may effectively reduce iodine content of polyarylene sulfide to prevent corrosion of post processing equipment, improve properties of polyarylene sulfide such as thermal stability, and the like, and thus, it may be usefully applied in the industrial field relating to preparation of polyarylene sulfide.

11 Claims, No Drawings

METHOD FOR PREPARING POLYARYLENE SULFIDE HAVING REDUCED IODINE CONTENT

CROSS REFERENCE TO RELATED APPLICATION

This application is a nationalization under 35 U.S.C. 371 of PCT/KR2011/000,667 filed Jan. 31, 2011 and published as WO 2011/093685 A2 on Aug. 4, 2011, which application claims priority to and the benefit of Korean Patent Application No. 10-2010-0009115, filed Feb. 1, 2010, which applications and publication are incorporated herein by reference in their entirety.

FIELD OF THE INVENTION

This disclosure relates to a method for preparing polyarylene sulfide, more specifically to a method for preparing polyarylene sulfide having reduced iodine content while having improved properties.

BACKGROUND OF THE INVENTION

Currently, polyarylene sulfide is representative engineering plastic, and is in great demand for high temperature and corrosive environment and electronic products due to high heat resistance, chemical resistance, flame resistance, and electric insulation. The major uses include computer accessories, automobile accessories, coating of the part contacting corrosive chemical materials, and industrial chemical resistant fiber, and the like.

Presently, polyphenylene sulfide (PPS) is the only commercially available polyarylene sulfide. According to the current commercial production process of PPS, p-dichlorobenzene (pDCB) and sodium sulfide are used as raw materials and reacted in a polar organic solvent such as N-methylpyrrolidone, and the like. This method is known as a Macallum process, and the basic process is disclosed in U.S. Pat. Nos. 2,513,188 and 2,583,941, wherein there are some usable polar solvents but N-methylpyrrolidone is currently most commonly used. This process uses dichloro aromatic compounds as raw material, and sodium chloride (NaCl) is generated as a by-product.

PPS obtained in the Macallum process has a molecular weight of about 10,000~40,000, and the melt viscosity is 3000 Poise or less, which is not so high. In general, to obtain higher melt viscosity, PPS is subjected to a curing process wherein it is contacted with oxygen while heating below melting point (Tm), and thereby, melt viscosity may be increased to required level by oxidation, crosslinking, polymer chain extension, and the like.

However, PPS produced by the existing process has fundamental disadvantages as follows.

First, sodium sulfide, and the like is used for supplying sulfur required in the polymer reaction, and thus, a large quantity of metal salts such as sodium chloride, and the like exist in the polymer as by-products. For this reason, even after the polymer obtained in the process is washed, metal salts remain in several thousands ppm level, thus increasing electric conductivity of the polymer, inducing corrosion of processing devices, and raising problems in the spinning process when making fibers. And, if sodium sulfide is used as raw material, production amount of by-product sodium chloride reaches 52 wt % of the weight of the raw material, which becomes waste because the recovery is economically infeasible.

Second, properties of the polymer undesirably change in, the curing process. The color turns deep by crosslinking and oxidation by oxygen, and brittleness becomes higher.

Finally, similarly to the polymers obtained by solution polymerization, the final PPS becomes very fine powders, which relatively lowers apparent density thus rendering it unfavorable for transportation and causing a lot of inconveniences in the manufacture process.

In addition to the Macallum process, new processes are suggested in U.S. Pat. Nos. 4,746,758, 4,786,713 and relating patents. In these patents, diiodide compounds and solid sulfur are used instead of bichloride compounds and metal sulfide in the existing process, and it is disclosed that polyarylene sulfide may be obtained by direct heating without using a polar solvent. This method consists of two steps of iodination and polymerization, wherein in the iodination process, aryl compounds and iodine are reacted to obtain a diiodide compound, which is reacted with solid sulfur to prepare polyarylene sulfide having high molecular weight in the polymerization process. During the reaction, iodines are generated in the form of steam, which may be recovered to react with aryl compounds again, and thus, iodine is substantially a catalyst.

However, the following two problems are primarily indicated to be solved in this process. First, since iodine is corrosive if it remains in a molecular state, it may cause problems in processing devices if is included in the final polyarylene sulfide product. Second, because solid sulfur is used in the polymerization process, a disulfide link is included in the final polyarylene sulfide, which deteriorates thermal properties including melting point.

Accordingly, there is a demand for development of a process that does not generate metal salts unnecessary in the process, may remarkably reduce the content of iodine causing corrosiveness in devices, and may effectively prepare polyarylene sulfide having mechanical strength.

SUMMARY OF THE INVENTION

The present invention provides a method for preparing polyarylene sulfide having low iodine content and excellent thermal stability.

The present invention also provides polyarylene sulfide having low iodine content and excellent thermal stability.

The present invention also provides a molded product including the polyarylene sulfide.

The present invention provides a method for preparing polyarylene sulfide including polymerization reacting reactants comprising diiodide aromatic compounds, sulfur compounds, and a polymerization terminator of the following Chemical Formula 1:

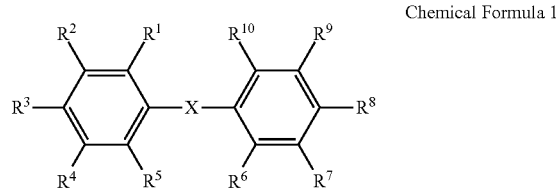

Chemical Formula 1 in the Chemical Formula 1, X is a chemical bond, O, S, N, carbonyl, or methylene, and $R^1$ to $R^{10}$ are independently hydrogen, a hydroxyl, a C1-5 alkyl, or a phenyl group.

The present invention also provides polyarylene sulfide prepared by the above method, having iodine content of 20,000 ppm or less, and a molded product including the same.

DETAILED DESCRIPTION OF THE INVENTION

Hereinafter, a method for preparing polyarylene sulfide according to one embodiment of the invention and polyarylene sulfide prepared thereby, and the like will be explained in detail.

The inventors focused on solving the problems of the existing polyarylene sulfide preparation methods by chemical methods. The reason for removing iodine in the final polymer is economically important as well as corrosion. It is known that in the method of using diiodidie aromatic compounds, isolated iodine molecules are included in the prepared polyarylene sulfide polymer, or bonded to the aryl group in the polymer.

Specifically, the present invention relates to a method for preparing polyarylene sulfide that may reduce residual iodine content in the final polymer during the polymerization process of polyarylene sulfide and simultaneously maintain properties of polyarylene sulfide equal or improved level.

According to one embodiment of the invention, a method for preparing polyarylene sulfide includes polymerization reacting reactants comprising diiodide aromatic compounds, sulfur compounds, and a polymerization terminator of the following Chemical Formula 1:

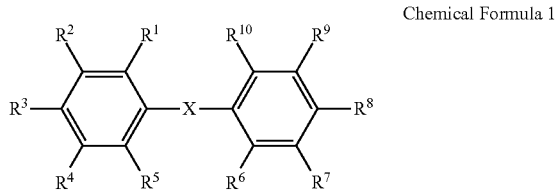

Chemical Formula 1 in the Chemical Formula 1, X is a chemical bond, O, S, N, carbonyl, or methylene, and $R^1$ to $R^{10}$ are independently hydrogen, a hydroxyl, a C1-5 alkyl, or a phenyl group.

Preferably, in the Chemical Formula 1, X is a chemical bond, or O, S. Meanwhile, if $R^1$ to $R^{10}$ are an alkyl group, it is not limited as long as it is a C1-5 alkyl group, but preferably, it may be a methyl, an ethyl, a propyl, an isopropyl, a butyl, or a t-butyl group.

It is confirmed that if polymerization reaction of polyarylene sulfide is progressed using the polymerization terminator of the Chemical Formula 1, iodine content in the polymerized polymer may be reduced and thermal stability of the prepared polymer may be excellent, compared to the case where the polymerization reaction is progressed without using a polymerization terminator, or using previously known polymerization terminator having a polymerization terminating group such as iodine, and the like. It is also confirmed that melt viscosity of the finally produced polyarylene sulfide may be easily controlled by controlling the added amount of the polymerization terminator of the Chemical Formula 1.

Meanwhile, the polymerization terminator is not specifically limited as long as it is defined by the Chemical Formula 1, but it may be preferably selected from the group consisting of diphenyl sulfide, diphenyl ether, biphenyl, benzophenone, and a combination thereof. More preferably, it may be diphenyl sulfide, diphenyl ether, or biphenyl, wherein a functional group between phenyl groups may function as an electron donor to exhibit more excellent action.

Meanwhile, the polymerization terminator may be included in the content of 0.3 to 2.8 parts by weight, based on 100 parts by weight of the diiodide compounds. If it is less than 0.3 parts by weight, based on 100 parts by weight of the diiodide compounds, effects of improving thermal stability and reducing iodine content according to use of the polymerization terminator may be insignificant, and if it is greater than 2.8 parts by weight, although iodine content may be reduced to a non-detectable level, polyarylene sulfide having too low melt viscosity may be polymerized.

Meanwhile, the diiodide aromatic compounds that may be used for the polymerization reaction of polyarylene sulfide may include diiodobenzene (DIB), diiodonaphthalene, diiodobiphenyl, diiodobisphenol, diiodobenzophenone, and a combination thereof, but are not limited thereto, and compounds pertaining to diiodide aromatic compounds wherein an alkyl group or a sulfone group, and the like is additionally bonded as a substituent group, or heteroatom such as oxygen or nitrogen, and the like is contained in the aryl compound may be also used. The diiodide aromatic compounds may be in the form of various isomers according to the bonding position of iodine atoms, and compounds such as pDIB, 2,6-diiodonaphthalene, or p,p'-diiodobiphenyl, wherein iodines are symmetrically bonded at both ends at the farthest distance may be most preferable.

Furthermore, sulfur compounds that may be used are not limited. Commonly, sulfur exists as cyclooctasulfur (S8) at room temperature, but any commercially available solid state sulfur may be used.

And, the diiodide aromatic compounds may be introduced in the content of 0.9 moles or more, based on 1 mole of the solid sulfur. And, the sulfur compounds may be preferably included in the content of 15 to 30 wt %, based on the weight of the polyarylene sulfide prepared by reacting diiodide aromatic compounds and sulfur compounds. If sulfur is added in the above range, heat resistance and chemical resistance may be increased, and simultaneously, polyarylene sulfide having excellent properties such as physical strength, and the like may be synthesized.

Meanwhile, the polymerization reaction may be progressed using reactants including diiodide aromatic compounds, sulfur compounds, and a polymerization terminator of the Chemical Formula 1 under conditions that may initiate a polymerization reaction. However, preferably, the polymerization reaction may be progressed under temperature-increasing and pressure-reducing conditions, and in this case, the polymerization reaction may be progressed for 1 to 30 hours while increasing temperature and reducing pressure under the initial reaction conditions of temperature of 180 to 250° C. and the pressure of 50 to 450 torr to the final temperature of 270 to 350° C. and the final pressure of 0.001 to 20 torr.

If the polymerization reaction is progressed under temperature-increasing and pressure-reducing conditions, iodine reducing efficiency may be high, and polymer having excellent thermal stability and excellent mechanical properties may be obtained.

Meanwhile, the method for preparing polyarylene sulfide according to the above explained embodiment may further include a step of melt mixing diiodide aromatic compounds, sulfur compounds, and the polymerization terminator of the Chemical Formula 1 before the polymerization reaction step. The above explained polymerization reaction is progressed as a melt polymerization that is progressed in the absence of an organic solvent, and to progress the melt polymerization, reactants including diiodide aromatic compounds may be previously melt mixed, and then, the polymerization reaction may be progressed.

The melt mixing conditions are not limited as long as it may melt mix all the reactants, but preferably, the melt mixing may be progressed at a temperature of 150 to 250° C.

By conducting melt mixing before polymerization, melt polymerization may be more easily achieved.

Meanwhile, the polymerization reaction may be progressed in the presence of a nitrobenzene-based catalyst. And, if a melt mixing step is conducted before the polymerization reaction, the catalyst may be added in the melt mixing step. It is confirmed that if polyarylene sulfide is polymerized in the presence of a nitrobenzene-based catalyst, polyarylene sulfide having higher melting point may be prepared compared to the polymerization in the absence of a catalyst. If the melting point of polyarylene sulfide is low, there is a problem in heat resistance of the product, and thus, to prepare polyarylene sulfide requiring heat resistance, a polymerization reaction may be progressed in the presence of a nitrobenzene-based catalyst. The nitrobenzene-based catalyst may include 1,3-diiodo-4-nitrobenzene, or 1-iodo-4-nitrobenzene, and the like, but is not limited thereto.

Furthermore, the finally prepared polyarylene sulfide has iodine content of 20,000 ppm or less, preferably 10,000 ppm or less, and simultaneously, has equal or improved properties including melt viscosity, melting point, and the like, compared to those produced by the existing methods. By reducing iodine content in the produced polyarylene sulfide 20,000 ppm or less, the risk of corrosion in process equipment, and the like may be almost reduced compared to the existing method. And, the melting point (Tm) may be 265 to 320° C., preferably 268 to 290° C., more preferably 270 to 285° C. By securing the melting point (Tm) in the high range, the polyarylene sulfide may manifest excellent performances including high strength and improved heat resistance, and the like, when applied as engineering plastic.

The polyarylene sulfide may have a melt viscosity of 20 to 100,00 poise, preferably 150 to 40,000 poise, more preferably 200 to 20,000 poise, still more preferably 300 to 15,000 poise. By securing the improved melt viscosity, the polyarylene sulfide may manifest excellent performances including high strength and improved heat resistance when applied as engineering plastic.

Meanwhile, to further reduce isolated iodines in the polyarylene sulfide polymerized according to the above embodiment, heat setting may be further progressed wherein the polymerized polyarylene sulfide is maintained at 100 to 260° C. The 'heat-setting' refers to a step of maintaining polymerized polymer in the solid state under specific temperature condition. And, the isolated iodines in the polymer means the isolated iodine molecules directly included in the polymer, and the content may be measured by cryo-milling a polymer sample, and then, sonicating the sample with methylene chloride at 50° C. for 1 hr, and quantitatively analyzing with UV Spectrometer (Varion).

Meanwhile, the heat setting may be conducted at 100 to 260° C. If the temperature is less than 100° C., effect of reducing isolated iodine content according to heat setting may be insignificant, and if the temperature is greater than or equal to 260° C., polymerized polymer may be molten or fused, and thus, significance of the heat setting may be deteriorated.

More preferably, the heat setting may be conducted at 130 to 250° C., most preferably at 150 to 230° C. As the heat setting temperature is higher, heat setting time for reducing isolated iodine contents below a certain level may be shortened.

Thus, the heat setting time may be controlled within 0.5 to 100 hours, considering the heat setting temperature. Preferably, the heat setting may be conducted for 1 to 40 hours.

The heat setting may be conducted under general atmospheric environment, but it may be preferably conducted while injecting at least one gas selected from the group consisting of nitrogen, air, helium, argon and steam. If heat setting is progressed while injecting the gas, isolated iodine reducing speed may be increased to shorten the heat setting time.

Meanwhile, the heat setting may be preferably conducted under vacuum condition, and in this case, isolated iodine reducing speed may also be increased to shorten the heat setting time.

According to another embodiment of the invention, there is provided polyarylene sulfide prepared by the above explained method, having iodine content of 20,000 ppm or less. Preferably, the polyarylene sulfide may have iodine content of 20,000 ppm or less.

And, the polyarylene sulfide may have a melting point of 265 to 320° C. And, the polyarylene sulfide may have a melt viscosity of 20 to 100,000 Poise, preferably 150 to 40,000 poise, more preferably 200 to 20,000 poise, still more preferably 300 to 15,000 poise. By securing the improved melt viscosity, the polyarylene sulfide may manifest excellent performances including high strength and improved heat resistance as engineering plastic.

According to yet another embodiment of the invention, there is provided a molded product including the polyarylene sulfide. The molded product may be in the form of a film, a sheet, or fiber.

The molded product may be obtained by processing the polyarylene sulfide by injection molding, extrusion molding, or blow molding, and the like. In the case of injection molding, mold temperature may be preferably 30° C. or more, more preferably 60° C. or more, still more preferably 80° C. or more in terms of crystallization, and it may be preferably 150° C. or less, more preferably 140° C. or less, still more preferably 130° C. or less in terms of modification of test piece. And, the molded product may be used as electric and electronic parts, construction element, automobile parts, machine parts or daily necessities, and the like.

The film or sheet may be made into undrawn, uniaxially drawn, biaxially drawn film, sheet, and the like. The fiber may be made into various fibers including undrawn, drawn, ultra-drawn fiber, and the like, which may be used as woven fabrics, knitting, non-woven fabrics (spoon bond, melt blow, staple), rope, net, and the like.

According to the present invention, polyarylene sulfide having improved thermal stability may be prepared while reducing iodine contents to the minimum.

Hereinafter, the present invention will be explained referring to the following examples. However, there examples are only to illustrate the invention, and the scope of the invention is not limited thereto.

Comparative Example

Polymerization of Polyarylene Sulfide

1. Polymerization of Polyarylene Sulfide of Comparative Example 1

A mixture consisting of 327.0 g of Pdib and 26.5 g of sulfur was heated to 180° C. to completely melt and mix, and the temperature was raised to 220° C. and the pressure was reduced to 200 torr, and then, the mixture was reacted for total 8 hours while changing the temperature and the pressure respectively to 320° C. and 1 torr or less by stages.

The produced polymer had a melt viscosity (MV) of 35,000 Poise, a melting point (Tm) of 265° C., and iodine content of 30,000 ppm.

2. Polymerization of Polyarylene Sulfide of Comparative Example 2

A polymerization reaction was progressed under the same conditions as Comparative Example 1, except that 0.2 g of m-diiodonitrobenzene was added as a catalyst when the pDIB and sulfur were initially melt mixed.

The produced polymer had MV of 40,000 Poise, Tm of 276° C., and iodine content of 31,000 ppm.

Example

Polymerization of Polyarylene Sulfide

1. Polymerization of polyarylene sulfide of Example 1

A polymerization reaction was progressed under the same conditions as Comparative Example 1, except that 1 g of biphenyl was added when the pDIB and sulfur were initially melt mixed.

The produced polymer had MV of 20,000 poise, Tm of 273° C., and iodine content of 5300 ppm.

2. Polymerization of Polyarylene Sulfide of Example 2

A polymerization reaction was progressed under the same conditions as Comparative Example 1, except that 3 g of biphenyl was added when the pDIB and sulfur were initially melt mixed.

The produced polymer had MV of 5,000 Poise, Tm of 276° C., and iodine content of 2200 ppm.

3. Polymerization of Polyarylene Sulfide of Example 3

A polymerization reaction was progressed under the same conditions as Comparative Example 1, except that 1 g of diphenyl sulfide was added when the pDIB and sulfur were initially melt mixed.

The produced polymer had MV of 15,000 Poise, Tm of 277° C., and iodine content of 4700 ppm.

4. Polymerization of Polyarylene Sulfide of Example 4

A polymerization reaction was progressed under the same conditions as Comparative Example 1, except that 3 g of diphenyl sulfide was added when the the pDIB and sulfur were initially melt mixed.

The produced polymer had MV of 3,000 poise, Tm of 280° C., and iodine content of 1500 ppm.

5. Polymerization of Polyarylene Sulfide of Example 5

A polymerization reaction was progressed under the same conditions as Comparative Example 1, except that 9 g of diphenyl sulfide was added when the pDIB and sulfur were initially melt mixed.

The produced polymer had MV of 40 poise, Tm of 275° C., and iodine content of less than 1 ppm.

6. Polymerization of Polyarylene Sulfide of Example 6

A polymerization reaction was progressed under the same conditions as Comparative Example 1, except that 3 g of diphenyl sulfide was added when the polymerization was progressed 50%.

The produced polymer had MV of 8,000 poise, Tm of 275° C., and iodine content of 12,000 ppm.

7. Polymerization of Polyarylene Sulfide of Example 7

A polymerization reaction was progressed under the same conditions as Comparative Example 1, except that 3 g of diphenyl sulfide and 0.2 g of m-diiodonitrobenzene as a catalyst were added when the pDIB and sulfur were initially melt mixed.

The produced polymer had MV of 2,500 poise, Tm of 281° C., and iodine content of 1,700 ppm.

8. Polymerization of Polyarylene Sulfide of Example 8

A polymerization reaction was progressed under the same conditions as Comparative Example 1, except that 3 g of diphenyl ether was added when the pDIB and sulfur were initially melt mixed.

The produced polymer had MV of 2,000 poise, Tm of 277° C., and iodine content of 1,700 ppm.

9. Polymerization of Polyarylene Sulfide of Example 9

A polymerization reaction was progressed under the same conditions as Comparative Example 1, except that 9 g of diphenyl ether was added when the pDIB and sulfur were initially melt mixed.

The produced polymer had MV of 17 poise, Tm of 276° C., and iodine content of less than 1 ppm.

10. Polymerization of Polyarylene Sulfide of Example 10

A polymerization reaction was progressed under the same conditions as Comparative Example 1, except that 3 g of benzophenone was added when the pDIB and sulfur were initially melt mixed.

The produced polymer had MV of 30,000 poise, Tm of 274° C., and iodine content of less than 19,000 ppm.

11. Polymerization of Polyarylene Sulfide of Example 11

A polymerization reaction was progressed under the same conditions as Comparative Example 1, except that 9 g of benzophenone was added when the pDIB and sulfur were initially melt mixed.

The produced polymer had MV of 15,000 poise, Tm of 271° C., and iodine content of less than 11,000 ppm.

The kinds and contents, and the added time of the additives used in the polymerization reaction of the above explained Comparative Examples and Examples are described in the following Table 1, and M.V., Tm, and iodine contents of the polyarylene sulfides polymerized according to the preparation methods are described in the following Table 2.

TABLE 1

| | Addtives | | | | |
|---|---|---|---|---|---|
| | Polymerization terminator | Introduced amount (g) | Catalyst | Introduced amount (g) | Added time |
| Comparative Example 1 | — | | — | | Early stage of reaction |
| Comparative Example 2 | — | | m-diiodo-nitrobenzene | 0.2 | Early stage of reaction |
| Example 1 | biphenyl | 1 | — | — | Early stage of reaction |
| Example 2 | biphenyl | 3 | — | — | Early stage of reaction |
| Example 3 | Diphenyl sulfide | 1 | — | — | Early stage of reaction |

TABLE 1-continued

| | Additives | | | | |
|---|---|---|---|---|---|
| | Polymerization terminator | Introduced amount (g) | Catalyst | Introduced amount (g) | Added time |
| Example 4 | Diphenyl sulfide | 3 | — | — | Early stage of reaction |
| Example 5 | Diphenyl sulfide | 9 | — | — | Early stage of reaction |
| Example 6 | Diphenyl sulfide | 3 | — | — | 반응 50% 시점 |
| Example 7 | Diphenyl sulfide | 3 | m-diiodo-nitrobenzene | 0.2 | Early stage of reaction |
| Example 8 | Diphenyl ether | 3 | — | — | Early stage of reaction |
| Example 9 | Diphenyl ether | 9 | — | — | Early stage of reaction |
| Example 10 | Benzophenone | 3 | — | — | Early stage of reaction |
| Example 11 | Benzophenone | 9 | — | — | Early stage of reaction |

TABLE 2

| | Tm (°C.) | M.V. (Poise) | Iodine content (ppm) |
|---|---|---|---|
| Comparative Example 1 | 265 | 35000 | 30000 |
| Comparative Example 2 | 276 | 40000 | 31000 |
| Example 1 | 273 | 20000 | 5300 |
| Example 2 | 276 | 5000 | 2200 |
| Example 3 | 277 | 15000 | 4700 |
| Example 4 | 280 | 3000 | 1500 |
| Example 5 | 275 | 40 | <1 |
| Example 6 | 275 | 8000 | 12000 |
| Example 7 | 281 | 2500 | 1700 |
| Example 8 | 277 | 2000 | 1700 |
| Example 9 | 276 | 17 | <1 |
| Example 10 | 274 | 30000 | 19000 |
| Example 11 | 271 | 15000 | 11000 |

Experimental Example

Measurement of Properties of Polyarylene Sulfides of Comparative Examples and Examples 1. Analysis of Melt Viscosity For the analysis of properties of the polymers synthesized according to Comparative Examples and Examples, melt viscosity (MV) was measured at 300° C. with a rotating disk viscometer.

2. Measurement of Melting Point (Tm)

A melting point was measured using Differential Scanning calorimeter (DSC).

3. Analysis of Iodine Content

The polymer samples polymerized according to Examples and Comparative Examples were pulverized, a fixed quantity thereof was combusted and ionized in an absorbent such as pure water, and the like, and then, iodine content was analyzed using combustion ion chromatograph for measuring the concentration of iodine ions.

As shown in the Table 2, if polymerization is conducted using a specific polymerization terminator according to the conditions of Examples, iodine content in polyarylene sulfide may be reduced to 20,000 ppm or less, and simultaneously, equal or higher Tm value, which relates to thermal stability, may be exhibited, compared to the case without using a polymerization terminator.

Therefore, according to the preparation method of polyarylene sulfide of Examples, iodine content may be reduced without influencing on the properties of polymer, and thus, the method may be widely used in the industrial field of preparing polyarylene sulfide.

What is claimed is:

1. A method for preparing polyarylene sulfide comprising polymerization reacting reactants comprising diiodide aromatic compounds, sulfur, and a polymerization terminator of the following Chemical Formula 1:

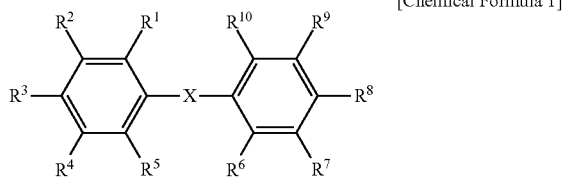

[Chemical Formula 1]

in the Chemical Formula 1, X is a chemical bond, O, S, N, carbonyl, or methylene, and $R^1$ to $R^{10}$ are independently hydrogen, a hydroxyl, a C1-5 alkyl group, or a phenyl group.

2. The method according to claim 1, wherein the polymerization terminator is selected from the group consisting of diphenyl sulfide, diphenyl ether, biphenyl, benzophenone, and a combination thereof.

3. The method according to claim 1, wherein the polymerization terminator is included in the content of 0.3 to 2.8 parts by weight, based on 100 parts by weight of the diiodide compound.

4. The method according to claim 1, wherein the diiodide compound is selected from the group consisting of diiodobenzene, diiodonaphthalene, diiodobiphenyl, diiodobisphenol, diiodobenzophenone, and a combination thereof.

5. The method according to claim 1, wherein polymerization reaction is conducted for 1 to 30 hours while increasing temperature and decreasing pressure under the initial reaction conditions of temperature of 180 to 250° C. and pressure of 50 to 450 torr to the final temperature of 270 to 350° C. and the final pressure of 0.001 to 20 torr.

6. The method according to claim 1, further comprising melt mixing the reactants before the polymerization reaction.

7. The method according to claim 1, wherein the polymerization reaction is progressed in the presence of a nitrobenzene-based catalyst.

8. The method according to claim 1, wherein the polyarylene sulfide has iodine content of 20,000 ppm or less.

9. The method according to claim 1, wherein the polyarylene sulfide has iodine content of 10,000 ppm or less.

10. The method according to claim 1, wherein the polyarylene sulfide has a melting point of 265 to 320° C.

11. The method according to claim 1, wherein the polyarylene sulfide has a melt viscosity of 20 to 100,000 Poise.

* * * * *